US008887250B2

(12) United States Patent
Kuzin et al.

(10) Patent No.: US 8,887,250 B2
(45) Date of Patent: Nov. 11, 2014

(54) TECHNIQUES FOR ACCESSING DESKTOP APPLICATIONS USING FEDERATED IDENTITY

(75) Inventors: Sergey A. Kuzin, Redmond, WA (US); Olga B. Ivanova, Redmond, WA (US); Ashwin Palekar, Sammamish, WA (US); Sriram Sampath, Redmond, WA (US); Arun K. Nanda, Sammamish, WA (US); Lucas R. Melton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 12/642,657

(22) Filed: Dec. 18, 2009

(65) Prior Publication Data

US 2011/0154465 A1  Jun. 23, 2011

(51) Int. Cl.
*G06F 17/30* (2006.01)
*H04L 29/08* (2006.01)
*H04L 29/06* (2006.01)

(52) U.S. Cl.
CPC ............ *H04L 67/08* (2013.01); *H04L 63/0815* (2013.01)
USPC .................................................. 726/5; 726/9

(58) Field of Classification Search
CPC .......................... H04L 67/08; H04L 63/0815
USPC .................... 713/150, 182; 726/2, 26, 5, 9
See application file for complete search history.

(56) References Cited

U.S. PATENT DOCUMENTS

| 2003/0163733 | A1* | 8/2003 | Barriga-Caceres et al. .. 713/201 |
| 2006/0123472 | A1* | 6/2006 | Schmidt et al. .................... 726/8 |
| 2007/0044143 | A1* | 2/2007 | Zhu et al. ........................... 726/8 |
| 2008/0021997 | A1* | 1/2008 | Hinton .......................... 709/225 |
| 2008/0263629 | A1* | 10/2008 | Anderson ......................... 726/2 |
| 2009/0089625 | A1 | 4/2009 | Kannappan |
| 2009/0248632 | A1 | 10/2009 | Subramanian |
| 2009/0260072 | A1* | 10/2009 | Rouskov et al. .................. 726/9 |

FOREIGN PATENT DOCUMENTS

| CH | WO 2007/073609 | * | 7/2007 | |
| WO | WO 02/15626 | * | 2/2002 | .............. H04Q 7/38 |
| WO | WO 2005050422 A1 | | 6/2005 | |
| WO | WO 2009027082 A1 | | 3/2009 | |

OTHER PUBLICATIONS

Thompson et al. Liberty ID-FF Implementation Guidelines, http://www.projectliberty.org/, Version: 1.2.*
Web Service Security, Microsoft, Dec. 2005.*
Thompson et al. Liberty ID-FF Implementation Guidelines, http://www.projectliberty.org/, Version: 1.2, 2004, 34pp.*
Buecker, et al., "Federated Identity and Trust Management," IBM, downloaded from http://redbooks.ibm.com/redpapers/pdfs/redp3678.pdf, 2008, 24 p.

(Continued)

*Primary Examiner* — Saleh Najjar
*Assistant Examiner* — Oleg Korsak
(74) *Attorney, Agent, or Firm* — Jim Sfekas; Kate Drakos; Micky Minhas

(57) ABSTRACT

Techniques for extending federation services to access desktop applications are herein described. In addition to the foregoing, other aspects are described in the claims, drawings, and text forming a part of the present disclosure.

20 Claims, 9 Drawing Sheets

(56) References Cited

OTHER PUBLICATIONS

Gomi, et al., "A Delegation Framework for Federated Identity Management," NEC Internet System Research Laboratory, downloaded from http://portal.acm.org/ft_gateway?id=1102502&type=pdf&coll=GUIDE&d1=GUIDE&CFID=57968727&CFTOKEN+69455594, 2005, 10 p.

Unknown, "Identity and Access Management: A Comprehensive Buyer's Guide," CA, downloaded from http://ca.com/Files/TechnologyBriefs/iam_buyers_guide.pdf, Nov. 2007, 25 p.

Unknown, "Understanding AD DS Functional Levels," Microsoft Technet, downloaded from http://technet.microsoft.com/en-us/library/cc754918(WS.10).aspx, Apr. 11, 2008, 5 p.

Vullings, et al., "Secure Federated Access to GRID Applications Using SAML/XACML," downloaded from http://209.85.229.132/search?q=cache:3mbAa_aLPMoJ:https://mams.melcoe.mq.edu.au/zope/mams/kb/a11/20050630%2520-%2520Secure%2520Federated%2520Access%2520to%2520Grid%2520Applications%2520using%2520SAML_XACML%2520-%2520Vullings-Buchhorn-Dalziel.pdf+Accessing+desktop+applications+using+Federated+Identity&cd=1&hl=en&ct=clnk&gl=uk on Oct. 16, 2009, 16 p.

* cited by examiner

TECHNIQUES FOR ACCESSING DESKTOP APPLICATIONS USING FEDERATED IDENTITY

BACKGROUND

Federated identity describes a set of technologies that enable authentication across autonomous security domains. One goal of federated identity is to enable users of one security realm to access secured data or systems of another security realm without the need to maintain separate accounts for the users in each security realm. For example, federated identity allows web-based services such as, for example, web-based email clients, collaborative workgroups, or resources stored on secured websites in a first security realm to be accessed by users that belong to a second security realm without actually having valid credentials in the first security realm. Federated identity uses trust-based relationships to allow enable organizations to issue valid credentials to users that present valid credentials from their own organization. Essentially, one organization "trusts" credentials from another organization. A user can obtain a valid credential from its authentication service and present it to the authentication service of a remote company. The remote company authentication service can "trust" that the credential is valid and can issue a credential that can be used within the remote company's security realm. The user can then access a web-based resource using the newly obtained credential.

This technique reduces administrative overhead in various ways. For example, separate user accounts don't need to be created for partners and partners wouldn't have to call the remote company's help desk when they forget their userids/passwords. Finally, federated identity reduces security risks. For example, if a partner is no longer with the partner organization and their ability to obtain a valid partner credential is revoked the partner's ability to access resources of the remote company is also revoked.

While these services work well for providing access to web-applications, they can not be used to log on to computer systems and thus can not be used to access desktop applications. Accordingly, techniques for extending federated identity to operate with applications that run in a desktop environment are desirable.

SUMMARY

An example embodiment of the present disclosure describes a method. In this example, the method includes, but is not limited to receiving a web-service access token that includes information identifying a user; generating a system access token for a remote desktop session from information stored in the web-service access token; and effectuating a remote desktop session that is associated with the system access token. In addition to the foregoing, other aspects are described in the claims, drawings, and text forming a part of the present disclosure.

An example embodiment of the present disclosure describes a method. In this example, the method includes, but is not limited to receiving a web-service access token issued by an authentication service in a first security realm; creating a user identifier from information in the web-service access token; and effectuating a remote desktop session, wherein the remote desktop session includes profile settings associated with the created user identifier. In addition to the foregoing, other aspects are described in the claims, drawings, and text forming a part of the present disclosure.

An example embodiment of the present disclosure describes a method. In this example, the method includes, but is not limited to obtaining a set of claims from a web-service access token issued by an authentication service in a first security realm, the web-service access token including information that identifies a user having an account in a second security realm; storing a set of privileges generated from the claims in a system access token, wherein privileges control access to system resources and system-related operations; and effectuating a remote desktop session associated with the system access token. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
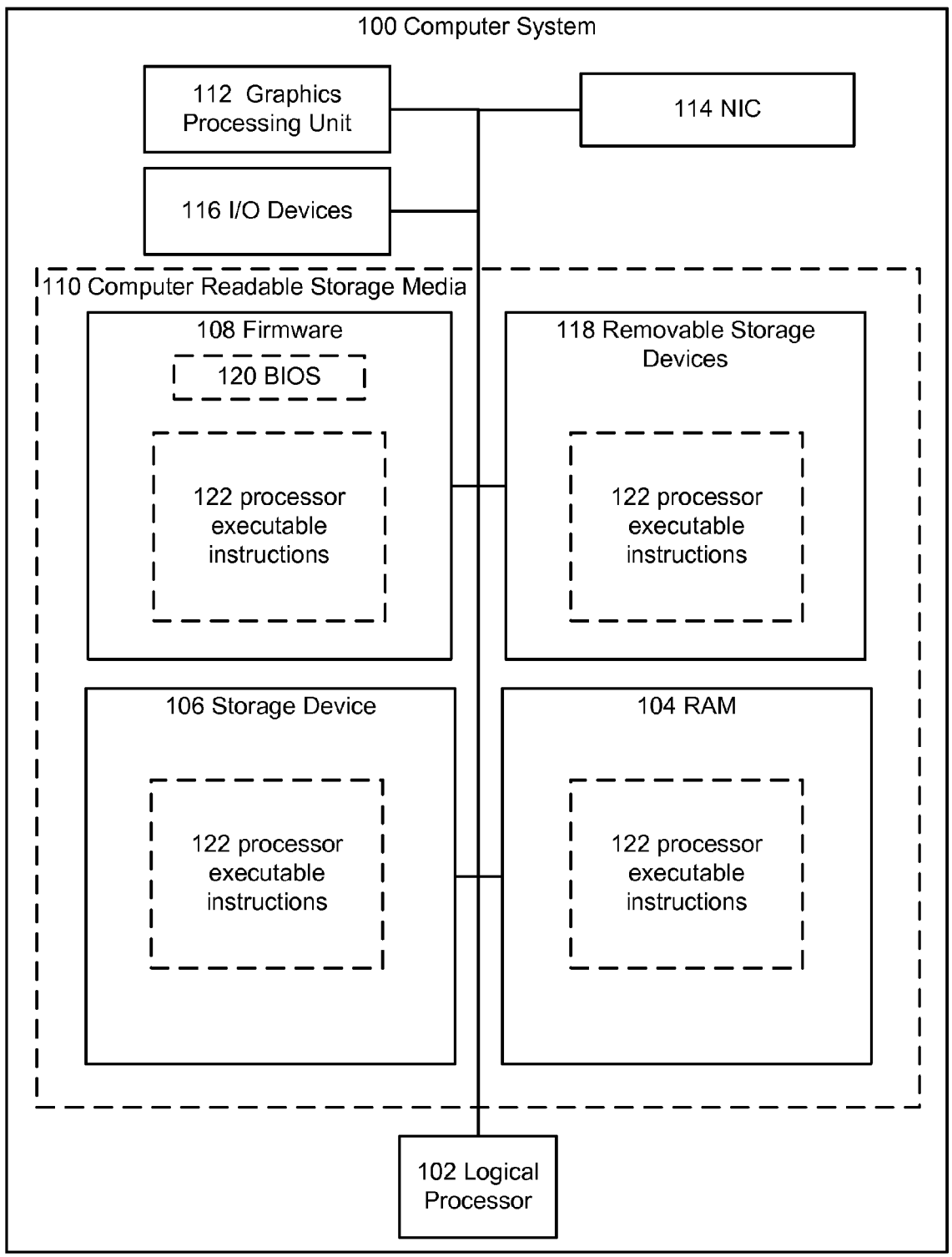
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that the preceding computer systems can have some or all of the components described with respect to computer 100 of FIG. 1.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by set switches. Moreover, the term circuitry can include one or more logical processors, e.g., one or more cores of a multi-core general processing unit. The logical processor(s) in this example can be configured by software instructions embodying logic operable to perform function(s) that are loaded from memory, e.g., RAM or ROM. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs. In at least one embodiment of the present disclosure the computer readable storage media 110 can store instructions that effectuate a token engine 300 described in more detail in the following paragraphs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
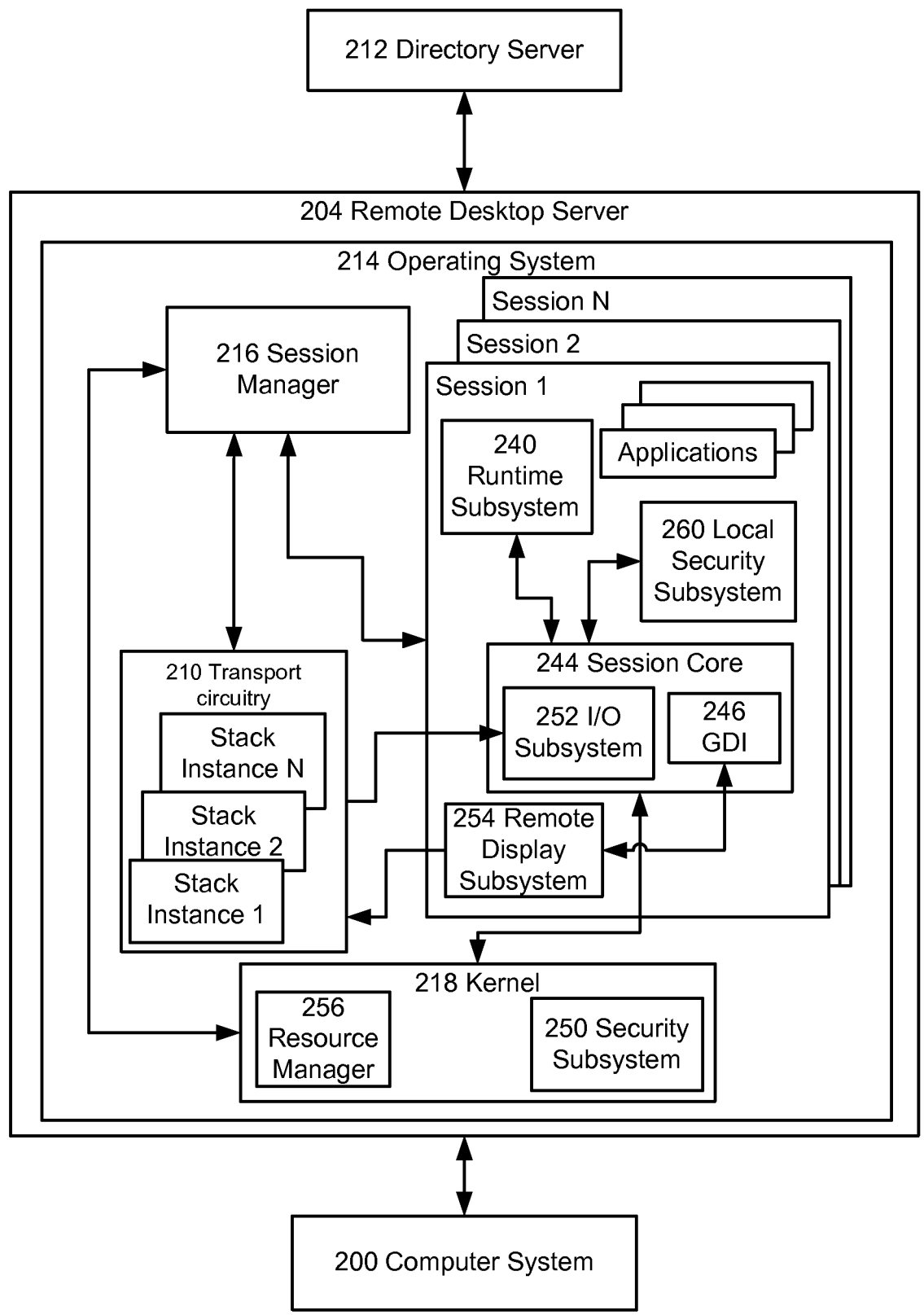
FIG. 2 depicts an operational environment for practicing aspects of the present disclosure.

Referring now to FIG. 2, it generally illustrates an example remote desktop environment including a remote desktop server 204 and a remote desktop client 200. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims.

Remote desktop server 204 can include circuitry configured to effectuate a remote desktop session for client 200 (while one client is depicted the server 204 in embodiments the remote desktop server 204 can service more clients). The example client can be a computer that includes similar elements as those of computer 100 FIG. 1. In this example embodiment the client 200 can include circuitry configured to effect operating systems and circuitry configured to emulate the functionality of terminals.

In the depicted example, the remote desktop server 204 can be configured to generate one or more sessions for connecting clients such as sessions 1 through N (where N is an integer greater than 1). Briefly, a session in example embodiments of the present disclosure can generally include an operational environment for a user to execute applications that are stored on the server 204. Similar to a console session, e.g., one where a user is logged into a computer physically located with the user, a remote desktop session can provide an operating system shell which can include a desktop and other familiar features that modern operating systems offer. These features are effectuated by a plurality of subsystems, e.g., software code, that interact with a kernel 218 of the operating system 214. For example, a session can include a subsystem that tracks mouse movement within the desktop, etc.

A session can be generated by the remote desktop server 204 on a user by user basis when, for example, the remote desktop server 204 receives a connection request over a network connection from an authenticated client. A connection request can first be handled by the transport logic 210 that can, for example, be effectuated by circuitry of the server 204. The transport circuitry 210 can in some embodiments include a network adaptor, firmware, and software that can be configured to listen for connection messages and forward them to the engine 212. As illustrated by FIG. 2, when sessions are generated the transport circuitry 210 can include protocol stack instances for each session. Generally, each protocol stack instance can be configured to route user interface output to an associated client and route user input received from the associated client to the appropriate session core 244.

A valid user credential can be received and sent to directory server 212. When a user credential is received directory server 212 can identify the user identifier associated with it and can send the user information to remote desktop server 204 which can generate a system access token that encapsulates the rights and identity of the user. In a Windows operating environment, the system access token can be used whenever a user attempts to execute a process to determine whether the user has the security credentials to run the process or thread. For example, when a process or thread of a session attempts to gain access, e.g., open, close, delete, and/or modify an object, e.g., a file, setting, or an application, the thread or process can be authenticated by the security subsystem 250 of the kernel 218. The security subsystem 250 can check the system access token against an access control list associated with the object and determine whether the thread has permission based on a comparison of information in the system access token and the access control list. If the security subsystem 250 determines that the thread is authorized then the thread can be allowed to access the object.

Session manager 216 can initialize and manage the session by for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can be configured to expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies and the resource manager 256 can create and terminate processes and threads in response to requests from the runtime subsystem 240.

Continuing with the description of FIG. 2, in an embodiment the session core 244 can include a graphics display interface 246 (GDI) and an input subsystem 252. The input subsystem 252 in an example embodiment can be configured to receive user input from the client 200 via the protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

Draw commands can be received from applications and/or a desktop and processed by the GDI 246. The GDI 246 in general can include a process that can generate graphical object draw commands. The GDI 246 in this example embodiment can be configured to pass the commands to the remote display subsystem 254 that can instantiate a display driver for the session. In an example embodiment the remote display subsystem 254 can be configured to include virtual display driver(s) that can be configured to receive the draw commands and transmit them to the client 200.

Figure 3:
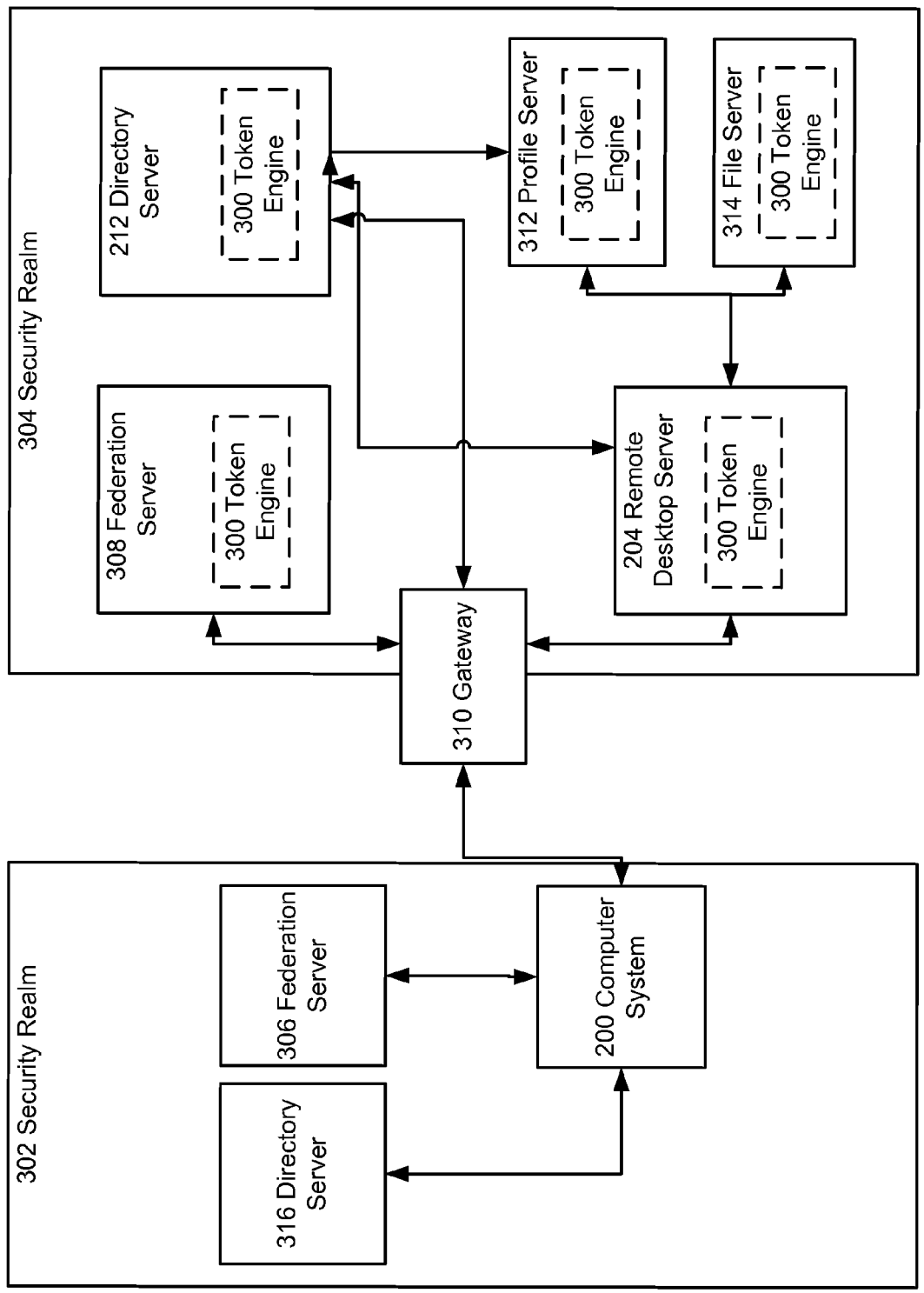
FIG. 3 depicts an operational environment for practicing aspects of the present disclosure.

Turning to FIG. 3, it illustrates an operational environment for practicing aspects of the present disclosure that uses an federated service infrastructure to generate system access tokens for remote desktop services session. Security realms 302 and 304 represent the security boundaries of two organizations such as companies or the like. An employee in a first organization has a user account, permissions, etc., in security realm 302 and an employee in a second organization has a user account, permissions, etc., in security realm 304. Generally speaking, objects which share a common directory database, trust relationships, and security policies belong to the same security realm.

In an embodiment web-service access tokens can be stored on client computer systems and used to access web applications and web-services. For example web applications typically have a high degree of interoperability, scalability, and manageability. Generally, a web application provides functionality over the web, usually in a data language, such as HTML, or other objects, such as Macromedia Flash® objects with functionality that can replace the functionality of the HTML pages (e.g., managing a logon event). Web applications typically communicate via the asynchronous HTTP over a TCP (Transmission Control Protocol) port, commonly port 80. Examples of web applications include e-commerce web sites such as www.microsoft.com and www.amazon.com. Web services typically incorporate some combination of programming, data and (possibly) human resources to provide services made available from an organization's web server to other web-connected programs. Exemplary web services may include major services, such as storage management and customer relationship management (CRM), down to much more limited services, such as online stock quotations and online bidding for an auction item.

Continuing with the description of FIG. 3, token engine 300 is shown that can synthesize user identifiers from web-service access tokens which in turn can be used to generate system access tokens. These system access tokens can in turn be used to start desktop sessions, and the like. Token engine 300 is shown in dashed lines to illustrate that in an embodiment token engine 300 can operate in one or more computer systems within security realm 304. In addition to obtaining a remote desktop session additional services can be accessed by the user such as profile server 312, file server 314, a SharePoint server, etc. These services can be passed an instance of the web-service access token issued by federation server 308 and can use it to generate system access tokens.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 4:
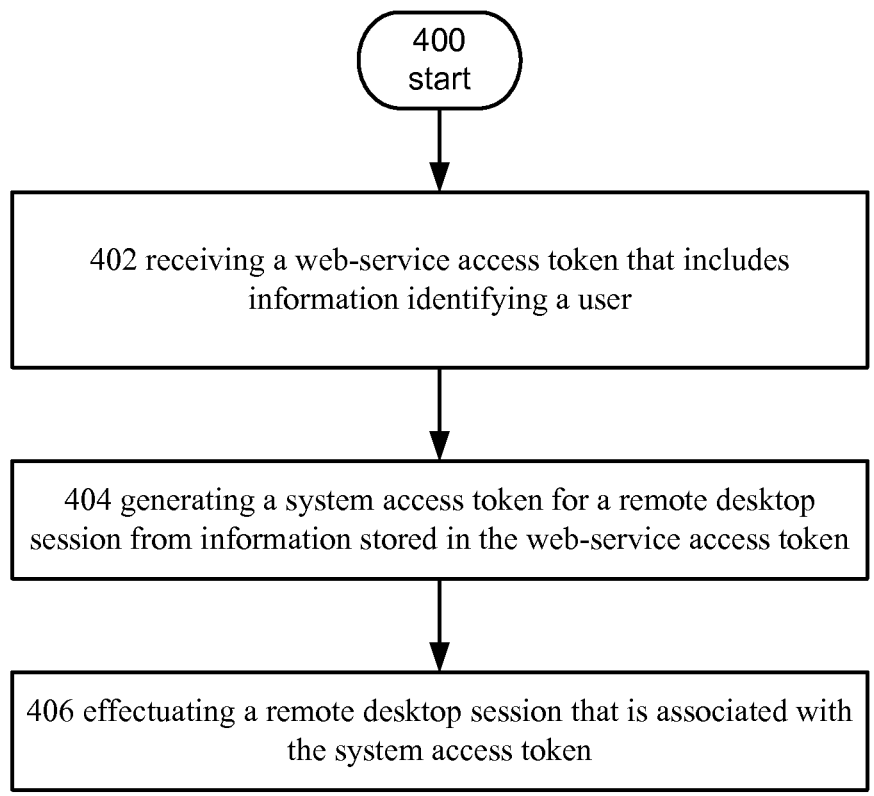
FIG. 4 illustrates an operational procedure for practicing aspects of the present disclosure.

Referring to FIG. 4, it illustrates an operational procedure for practicing aspects of the present disclosure including operations 400, 402, and 404. Operation 400 begins the operational procedure and operation 402 shows receiving a web-service access token that includes information identifying a user. For example, and turning to FIG. 3 for reference, in an embodiment a computer system in security realm 304 can execute a token engine 300, e.g., a logical processor configured by instructions, and the computer system can receive a web-service access token issued by federation server 308 and/or federation server 306. In one example embodiment the computer system can be directory server 212. In another example embodiment the computer system can be remote desktop server 204. In an example directory server 212 can run token engine 300 and token engine 300 can receive the web-service access token from a trusted third-party. The web-service access token can be encoded to conform to the Security Assertion Markup Language protocol (SAML) or it could be a Kerberos ticket. For example, for Kerberos the trusted third party could be a Key distribution center. For SAML tokens the trusted third party could be a Security Token Service. In this example the web-service access token could have been issued by federation server 308.

Continuing with the description of FIG. 4, operation 404 shows generating a system access token for a remote desktop session from information stored in the web-service access token. For example and turning back to FIG. 3, a remote desktop server 204 can generate a system access token from information stored in the web-service access token. For example, a system access token, e.g., an object that includes security information that allows threads of processes to access system resources of a computer system, can be generated from information stored in the web-service access token, e.g., a SAML token or Kerberos ticket. The web-service access token can include identity information, group information, or custom information. For example, identity information can include user principal names, i.e., Kerberos-style information such as user@realm, emails, e.g., user@domain, common name, or an arbitrary string that is used to uniquely identity an employee. Group information can identify membership in a group or role and administrators can define individual claims that have the group type.

Turning to operation 406, it shows effectuating a remote desktop session that is associated with the system access token. For example, and turning back to FIG. 3 for reference, a remote desktop session can be effectuated for a user. In this example the system access token can be used by the computer system maintaining the remote desktop session to validate access requests made by threads and processes that are executed by a user. For example, if a user attempts to run a program such as Microsoft Excel®. The Excel process can include an instance of the system access token and can pass the token to a security subsystem 250 of FIG. 2. The security subsystem 250 can include instructions for comparing information in the system access token to information in an access control list to determine whether the system access token has the requisite authority to run Excel®. If the system access token includes such information, the security subsystem 250 can allow the process to execute.

Figure 5:
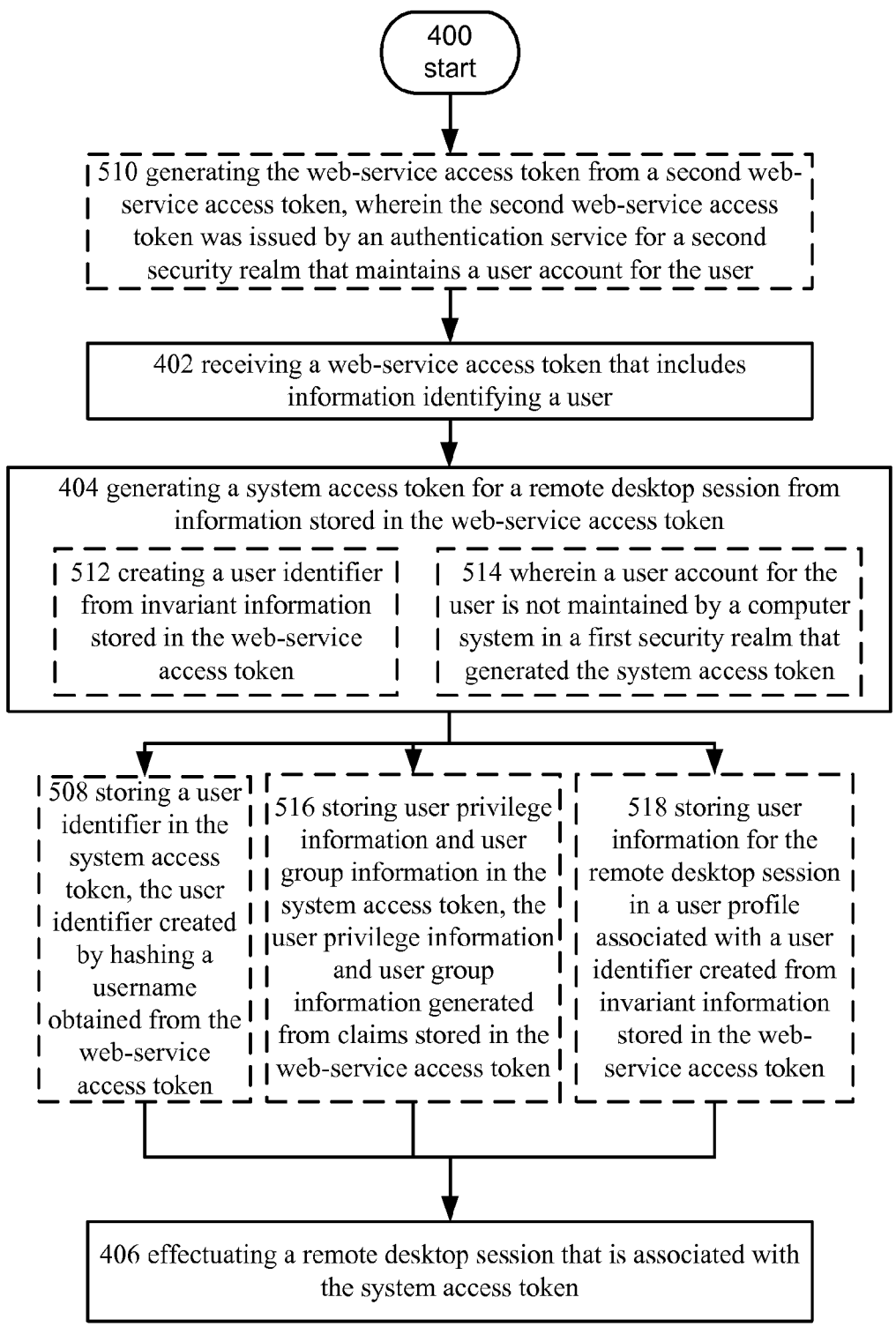
FIG. 5 depicts an alternative embodiment of the operational procedure of FIG. 4.

Turning now to FIG. 5, it illustrates an alternative embodiment of the operational procedure of FIG. 4 including additional operations 508-518. Operation 508 shows storing a user identifier in the system access token, the user identifier created by hashing a username obtained from the web-service access token. For example, in an embodiment of the present disclosure a user identifier can be created by token engine 300 by hashing a username obtained from the web-service access token. Token engine 300 executing on, for example, directory server 212 can use a hash function to convert the username into a hash value. The hash value can be searched in directory server 212 and a user identifier can be located or created. The directory server 212 can send the user identifier to remote desktop server 204 which can store the user identifier in the system access token. In an example embodiment the user identifier can be checked when a process runs to determine whether it is on an access control list for a secured object. If the user identifier is listed in the access control list then the process can execute.

Continuing with the description of FIG. 5, operation 510 shows generating the web-service access token from a second web-service access token, wherein the second web-service access token was issued by an authentication service for a second security realm that maintains a user account for the user. For example, and turning to FIG. 3 for reference, in an embodiment the web-service access token can be generated from another web-service access token that was issued by an authentication service in security realm 302. For example, directory server 316 of security realm 302 can be configured to store a user account for user of computer system 200. The user may be validated and obtain account information that can be presented to federation server 306. In this example user of computer system 200 may obtain a web-service access token from federation server 306 and store it in a web-browser. In this example federation server 308 can be configured to "trust" web-service access tokens issued by federation server 306 and issue a valid web-service access token for security realm 304 when it receives one. In an example embodiment the federation server 308 can be configured to "trust" web-service access tokens that have valid digital signatures. For example, web-service access tokens issued by federation server 306 can be digitally signed and federation server 308 can be configured to validate the signatures before issuing valid web-service access tokens for security realm 304. In this example embodiment a user of computer system 200 can obtain a remote desktop services session without having an account in security realm 304.

In a specific example a user of computer system 200 can type in a uniform resource locator for the remote desktop server 204. Gateway server 310 can receive the request and send back a webpage asking for a username and password that is valid for security realm 304. In this example the user of computer system 200 may not have an account in directory server 212 however user of computer system 200 may have access to a valid credential for security realm 302. In this example computer system 200 can send the web-based access token generated by, for example, federation server 306, to gateway server 310 and it can be routed to federation server 308. Federation server 308 can validate that the web-based access token issued by federation server 306 and grant a web-based access token that is valid for entering security realm 304 and the web-based access token for security realm 304 can be forwarded to directory server 212. Directory server 212 can determine that a user account for this user does not exist and can pass the credential to token engine 300 which can synthesize a user identifier and, for example, group information used to create a system access token and pass it to the remote desktop server 204 which can create a system access token and start a remote desktop session for the user.

Continuing with the description of FIG. 5, operation 512 shows creating a user identifier from invariant information stored in the web-service access token. For example, and turning to FIG. 3, invariant information stored in the web-service access token, i.e., any information that is guaranteed to be present in a web-service access token issued by federation server 306 or 308 can be used to create the user identifier stored in the system access token. For example, the organizations that control security realm 302 and 304 can agree to place certain information in web-service access tokens that can be used to generate user identifiers. For example, the name of the organization the user is associated with can be placed in the web-service access tokens issued by one or both of the federation servers 306 and 308. In this example the user identifier generated may be the same for all the users associated with security realm 302 and thus all users from security realm 302 may get the same user identifier. In another example information such as email address/organization name can be used to generate user identifiers. In this case each user from security realm 302 would obtain a unique user identifier (assuming that each email address is unique).

Refinement 514 shows wherein a user account for the user is not maintained by a computer system in a first security realm that generated the system access token. For example, in an embodiment directory server 312 may not store a user account for the user associated with computer system 200. For example, directory server 212 may typically be configured to store user accounts, e.g., username/password combinations, and associate the user accounts with user identifiers. The directory server 212 can be configured to receive valid username/password combinations and locate the user identifier for the user. In embodiments of the present disclosure directory server 212 can create user identifiers without an associated user account being stored in the directory by using information stored in a web-service access tokens.

Continuing with the description of FIG. 5, operation 516 illustrates storing user privilege information and user group information in the system access token, the user privilege information and user group information generated from claims stored in the web-service access token. For example, in an embodiment the web-service access token can include claims. Claims are assertions made by the service that generated the web-service access token. Example claims and claim formatting can be found in U.S. application Ser. No. 11/361,281 entitled "Identity Providers in Digital Identity System" herein incorporated by reference in its entirety. For example a claim may be an email address for the user associated with the computer system presenting the web-service access token. Privileges are rights associated with user accounts such as a user or group account, to perform various system-related operations on the local computer, such as executing certain programs, shutting down the system, loading device drivers, or changing the system time. When user tries to perform a privileged operation, the system checks the user's system access token to determine whether the user holds the necessary privileges, and if so, it checks whether the privileges are enabled. If the user fails these tests, the system does not perform the operation. Group information identifies what groups the user account is associated with. Each group can include a list of privileges held by members of the group.

In this example token engine 300 can use the claims (or lack of claims) in the web-service access token to obtain privilege and group information and store it in the system access token. For example, a web-service access token that includes a claim about a user, e.g., an email account, can be used to set what groups and privileges that user has. For example, token engine 300 can receive the web-service access token and determine that the user is from a different organization by determining that the email is from a foreign domain. Token engine 300 can then search a database that maps the foreign domain to a set of groups and privileges. Token engine 300 can then insert the privileges and group membership information in a system access token.

Turning to operation 518 of FIG. 5, it shows storing user information for the remote desktop session in a user profile associated with a user identifier created from invariant information stored in the web-service access token. For example and turning to FIG. 3, in an embodiment a user profile can be created and associated with a user identifier that was created from, for example, invariant information in the web-service access token. The user profile can be settings and information that describe how the user has arranged their desktop environment. Profile server 312 can receive the created user identifier and search for a file that is associated with it. The file can indicate, for example, the background desktop theme that the user set, the files the user has created, etc. When the remote desktop session is being generated by remote desktop server 204 it can fetch the user profile information and use it to create a customized execution environment.

Figure 6:
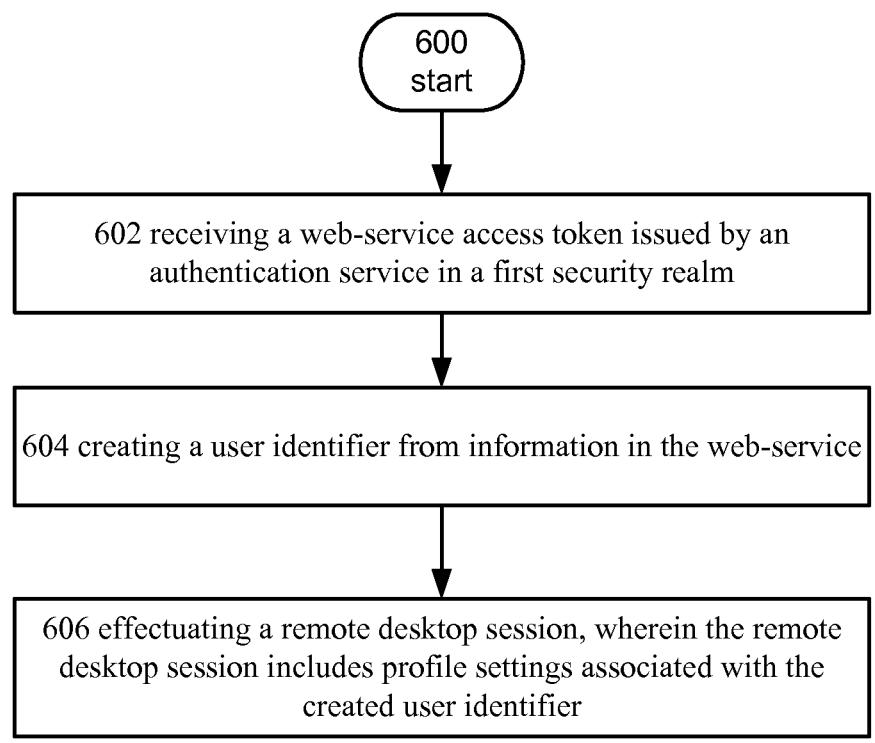
FIG. 6 depicts operational procedure for practicing aspects of the present disclosure.

Turning now to FIG. 6, it illustrates an operational procedure for practicing aspects of the present disclosure including operations 600, 602, 604, and 606. Operation 600 begins the procedure and operation 602 shows receiving a web-service access token issued by an authentication service in a first security realm. For example, and turning to FIG. 3, a computer system in security realm 304 can execute token engine 300, e.g., a logical processor configured by instructions, and can receive a web-service access token issued by federation server 308 and/or federation server 306. For example, in an embodiment token engine 300 can be run at least in part by directory server 212 and the web-service access token can be issued by federation server 308.

Continuing with the description of FIG. 6, operation 604 shows creating a user identifier from information in the web-service access token. For example, and turning to FIG. 3, information stored in the web-service access token can be used to create the user identifier that is stored in a system access token. For example, the organizations that control security realm 302 and 304 can agree to place certain information in web-service access tokens that can be used to create user identifiers. For example, the name of the organization or the user can be placed in the web-service access tokens issued by one or both of the federation servers 306 and 308. In this example the user identifier generated may be the same for all the users associated with security realm 302 and thus all users from security realm 302 may get the same session. The token engine 300 can use a hash function to convert the information into a hash value and the hash value can be stored in the system access token as the user identifier. In an example embodiment the user identifier can be checked when a process runs to determine whether it is on an access control list for a secured object. If the security identifier is listed in the access control list then the process can execute.

Continuing with the description of FIG. 6, operation 606 shows effectuating a remote desktop session, wherein the remote desktop session includes profile settings associated with the created user identifier. For example, and turning back to FIG. 3 for reference, a remote desktop session can be effectuated for a user. In this example the system access token can be used by the computer system maintaining the remote desktop session to validate access requests made by threads and processes that are executed by a user. A user profile associated with the created user identifier can be loaded when the remote desktop session is started. The user profile can be settings and information that describe how the user has arranged their desktop environment and stored by profile server 312. Profile server 312 can receive the created user identifier and search for a file that is associated with it. The file can indicate, for example, the organizational layout of the desktop. When the remote desktop session is being generated by the remote desktop server 204 it can fetch the user profile information and use it to create a customized execution environment.

Figure 7:
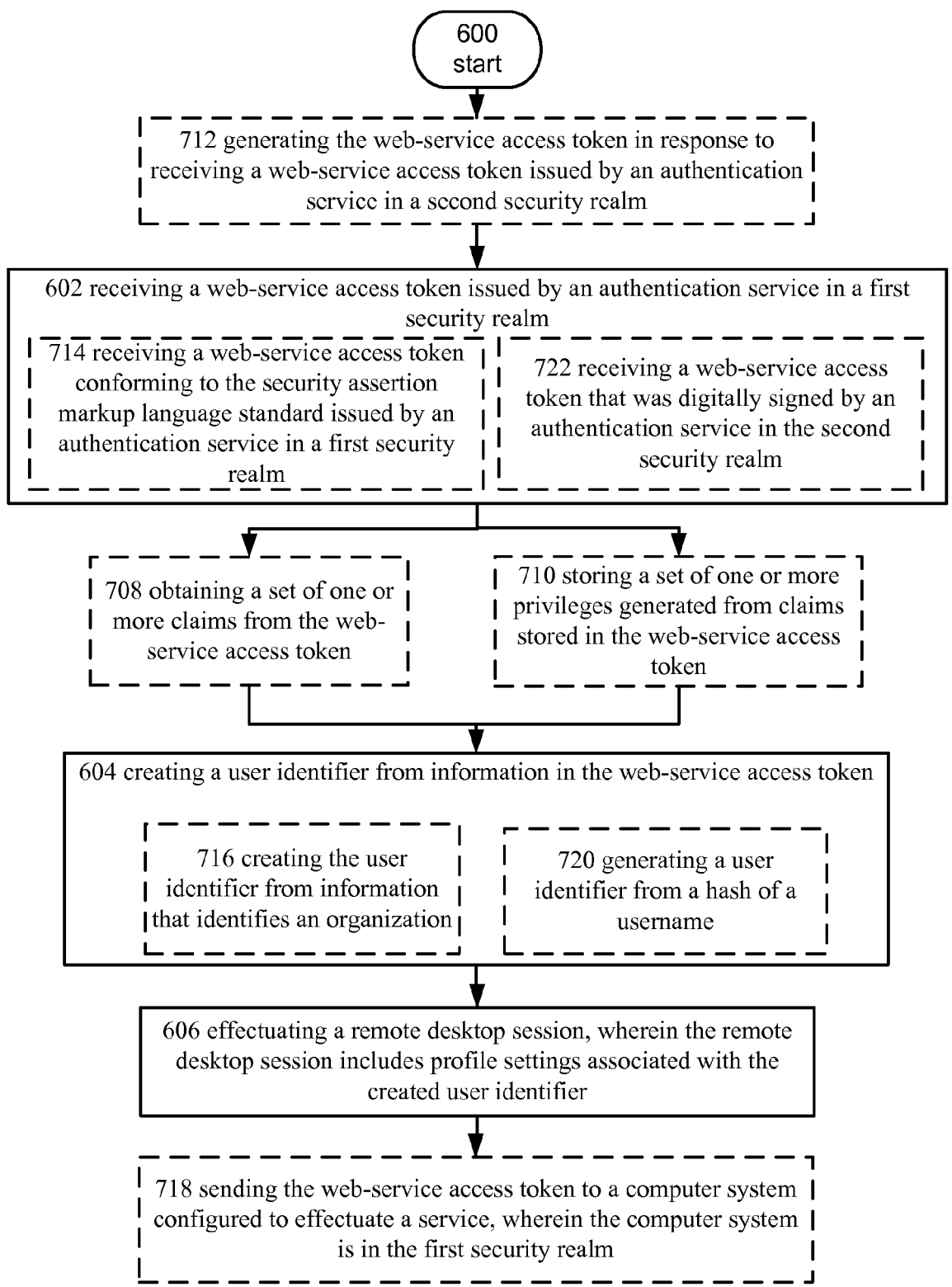
FIG. 7 depicts an alternative embodiment of the operational procedure of FIG. 6.

Turning to FIG. 7, it illustrates an alternative embodiment of the operational procedure of FIG. 6 including additional operations 708-722. Operation 708 illustrates obtaining a set of one or more claims from the web-service access token. For example, in an embodiment token engine 300 can extract a set of one or more claims from the web-service access token. As stated above, claims are assertions made by the service that generated the web-service access token such as the identity of the user, organization the user belongs to, etc. Token engine 300 can be configured to "trust" that these claims are valid. For example a claim may be the role the user has in their own organization, e.g., super-user, employee, administrator, or it could be a role that the user has in the foreign organization, e.g., partner or affiliate roles.

Continuing with the description of FIG. 7, operation 710 illustrates storing a set of one or more privileges generated from claims stored in the web-service access token. For example, privileges are rights associated with user accounts such as a user or group account, to perform various system-related operations on the local computer, such as executing certain programs, shutting down the system, loading device drivers, or changing the system time. In an embodiment the web-service access token can be received by token engine 300 executing on federation server 308. In this example token engine 300 may add certain privileges to the web-service access token and send the token back to computer system 200. Token engine 300 running on directory server 212 can then receive the token and generate a user identifier and group information that includes these privileges. Put another way token engine 300 can instruct directory server 212 to create an entry in a directory that includes a user identifier associated with a set of privileges. In an example embodiment token engine 300 may execute on multiple systems and may add privileges as they are needed to access resources. In this example it by configuring token engine 300 to just add permissions when they are needed the overhead associated with generating every system access token at one point will be reduced and allow a more granular service to be effectuated. For example, token engine 300 of federation server 308 may only add privileges that allow the user to obtain a system access token with privileges to access resources in a remote desktop session. Other instances of the token engine 300 may determine whether to add privileges if the user attempts to access other resources, e.g., file server 314, the resources may check to see if privileges can be added to access these resources as they are requested.

Continuing with the description of FIG. 7, operation 712 shows generating the web-service access token in response to receiving a web-service access token issued by an authentication service in a second security realm. For example, and turning to FIG. 3 for reference, in an embodiment the web-service access token can be generated from another web-service access token that was issued by an authentication service in security realm 302. For example, directory server 316 of security realm 302 can be configured to store a user account for user of computer system 200. In this example user of computer system 200 may be authenticated and the use account with a set of permissions can be obtained and sent to federation server 306 and stored locally on computers system 200. Federation server 306 can receive the account information and generate a web-service access token from for security realm 302. In this example federation server 308 can be configured to "trust" web-service access tokens issued by federation server 306 and issue a valid web-service access token for security realm 304 when it receives one. In an example embodiment federation server 308 can be configured to "trust" web-service access tokens that have valid digital signatures. For example, web-service access tokens issued by federation server 306 can be digitally signed and federation server 308 can be configured to validate the signatures before issuing valid web-service access tokens for security realm 304.

Continuing with the description of FIG. 7, operation 714 shows receiving a web-service access token conforming to the security assertion markup language standard issued by an authentication service in a first security realm. For example, in an embodiment the web-service access token can be encoded to conform to the Security Assertion Markup Language protocol. The Security Assertion Markup Language is an XML based language used in web-browser single sign on operations to exchange authentication information between security realms.

Continuing with the description of FIG. 7, operation 716 shows creating the user identifier from information that identifies an organization. For example, and turning to FIG. 3, information that identifies the organization the user is associated with, e.g., corporate name information, is stored in the web-service access token and this information can be used to create the user identifier used by the system access token. In this example the user identifier created may be the same for all the users associated with security realm 302 and thus all users from security realm 302 may get the same user identifier. In another example organization information can be combined with email address to create user identifiers. In this case each user from security realm 302 would obtain a unique user identifier (assuming that each email address is unique).

Continuing with the description of FIG. 7, operation 718 shows sending the web-service access token to a computer system configured to effectuate a service, wherein the computer system is in the first security realm. For example, in an embodiment the web-service access token can be forwarded to other computer systems in the security realm 304 and used to grant access. For example, file server 314 can be configured to receive the web-service access token in addition to directory server 212 and use it to determine whether to grant access to the resources it controls. In this example each computer system can generate a system access token from the web-service access token so that the user can access the resources of multiple computer systems in security realm 304.

Turning to operation 720 it shows generating a user identifier from a hash of a username. For example, in an embodiment of the present disclosure a user identifier can be created by token engine 300 by hashing a username obtained from the web-service access token. For example, a username could be generated from identity information such as an employee id or a social security number. Token engine 300 can use a hash function used to convert the username into a hash value and the hash value can be stored in the system access token. In an example embodiment the user identifier can be checked when a process runs to determine whether it is on an access control list for a secured object. If the security identifier is listed in the access control list then the process can execute.

Turning to operation 722 it shows receiving a web-service access token that was digitally signed by an authentication service in the second security realm. For example, in an embodiment a web-service access token issued by federation server 306 can include a digital signature. Federation server 308 can then validate the digital signature and be configured to issue a web-service access token that is valid for security realm 304. For example, a digital signature gives a recipient reason to believe that the message was created by a known sender and that it was not altered in transit. Generally asymmetric cryptography is used in a digital signature scheme. In this example federation server 306 can include a private signing key and a signing algorithm. The signing algorithm can hash the contents of the web-service access token and encrypt the hash using the private key to generate a signature. The signature can then be embedded in the web-service access token. Federation server 308 can include a public key and a signature verifying algorithm. The signature verifying algorithm, e.g., a program including instructions to effectuate the signature verifying algorithm, can decrypt the hash and compare the decrypted hash to a hash of the contents of the web-service access token. If the decrypted hash is equal to the hash of the contents of the web-service access token the signature is valid.

Figure 8:
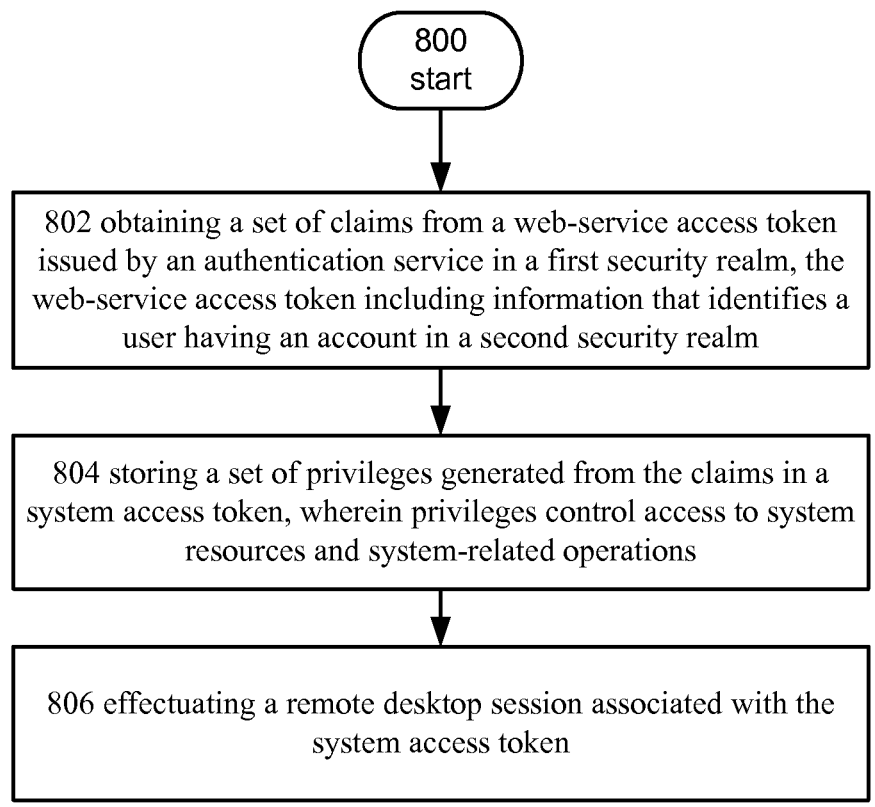
FIG. 8 depicts operational procedure for practicing aspects of the present disclosure.

Turning now to FIG. 8, it illustrates an operational procedure for practicing aspects of the present disclosure including operations 800 to 806. Operation 800 begins the procedure and operation 802 shows obtaining a set of claims from a web-service access token issued by an authentication service in a first security realm, the web-service access token including information that identifies a user having an account in a second security realm. For example, and turning to FIG. 3, a computer system in security realm 304 can execute a token engine 300, e.g., a logical processor configured by instructions, and can receive a web-service access token issued by federation server 308. As stated above, claims are assertions made by the service that generated the web-service access token such as the identity of the user, organization the user belongs to, etc. Token engine 300 can be configured to "trust" that these claims are valid. For example a claim may be the role the user has in their own organization, e.g., super-user, employee, administrator, or it could be a role that the user has in the foreign organization, e.g., partner or affiliate roles.

Continuing with the description of FIG. 8, operation 804 shows storing a set of privileges generated from the claims in a system access token, wherein privileges control access to system resources and system-related operations. For example, in an embodiment token engine 300 can use the claims (or lack of claims) in the web-service access token to obtain privilege information and store it in the system access token. For example, a web-service access token that includes a claim about a user, e.g., an email account, can be used to set privileges for a user session. For example, token engine 300 can receive the web-service access token and determine that the user is from a different organization by determining that the email is from a foreign domain. Token engine 300 can search a database that maps the foreign domain to a set of privileges. Token engine 300 can then pass these privileges to remote desktop server 204 which can create a system access token including the privileges.

Operation 806 shows effectuating a remote desktop session associated with the system access token. For example, and turning back to FIG. 3 for reference, a remote desktop session can be effectuated for a user. In this example the system access token can be used by the computer system maintaining the remote desktop session to validate access requests made by threads and processes that are executed by a user. For example, if a user attempts to run a program such as Microsoft Excel®. The Excel process can include an instance of the system access token and can pass the token to a security subsystem 250 of FIG. 2. The security subsystem 250 can include instructions for comparing information in the system access token to information in an access control list to determine whether the system access token has the requisite authority to run Excel®. If the system access token includes such information, the security subsystem 250 can allow the process to execute.

Figure 9:
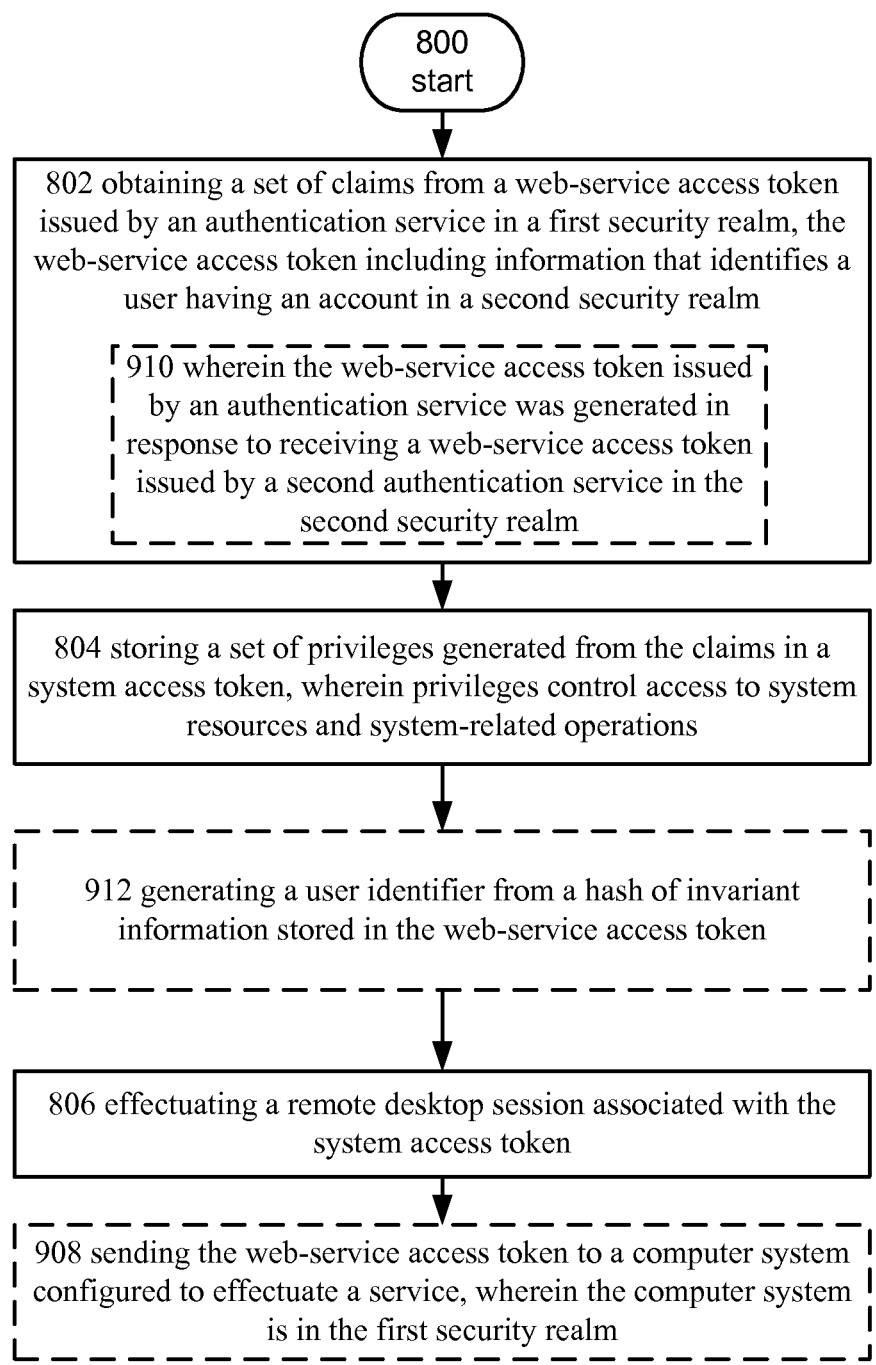
FIG. 9 depicts an alternative embodiment of the operational procedure of FIG. 8.

Turning now to FIG. 9, it shows an alternative embodiment of the operational procedure of FIG. 8 including operations 908, 910, and 912. Operation 908 illustrates sending the web-service access token to a computer system configured to effectuate a service, wherein the computer system is in the first security realm. For example, and similar to techniques described above, in an embodiment the web-service access token can be forwarded to other computer systems in the security realm 304 and used to grant access. For example, a file server 314 can be configured to receive the web-service access token in addition to directory server 212 and use it to determine whether to grant access to the resources it controls. In this example each computer system can generate a system access token from the web-service access token so that the user can access the resources of multiple computer systems in security realm 304.

Operation 910 illustrates the web-service access token issued by an authentication service was generated in response to receiving a web-service access token issued by a second authentication service in the second security realm. For example, and turning to FIG. 3 for reference, in an embodiment the web-service access token can be generated from another web-service access token that was issued by an authentication service in security realm 302. For example, directory server 316 of security realm 302 can be configured to store a user account for user of computer system 200. In this example user of computer system 200 may be authenticated and the user profile can be retrieved from directory server 316 and sent to federation server 306. Federation server 306 can generate a web-service access token in security realm 302 and store it locally on the client. In this example federation server 308 can be configured to "trust" web-service access tokens issued by federation server 306 and issue a valid web-service access token for security realm 304 when it receives one. In an example embodiment federation server 308 can be configured to "trust" web-service access tokens that have valid digital signatures. For example, web-service access tokens issued by federation server 306 can be digitally signed and federation server 308 can be configured to validate the signatures before issuing valid web-service access tokens for security realm 304.

Operation 912 shows generating a user identifier from a hash of invariant information stored in the web-service access token. For example, and turning to FIG. 3, invariant information stored in the web-service access token, i.e., any information that is guaranteed to be present in a web-service access token issued by federation server 306 or 308 can be used to create the user identifier used by the system access token. For example, the organizations that control security realm 302 and 304 can agree to place certain information in web-service access tokens that can be used to generate user identifiers. For example, the name of the organization the user is associated with can be placed in the web-service access tokens issued by one or both of federation servers 306 and 308. In this example the user identifier generated may be the same for all the users associated with security realm 302 and thus all users from security realm 302 may get the same user identifier. In another example information such as email address/organization name can be used to generate user identifiers. In this case each user from security realm 302 would obtain a unique user identifier (assuming that each email address is unique).

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system, comprising:
   circuitry for receiving a user credential;
   circuitry for generating a web-service access token based on the received user credential, the web-service access token including information identifying a user, the web-service access token containing information used to authenticate the user to access one or more web applications or web services;
   circuitry for generating a system access token for a remote desktop session from information stored in the web-service access token, the system access token containing information used to authenticate threads of processes to access system resources of a computer system in the remote desktop session;
   circuitry for validating an access request by the user to effectuate the remote desktop session comprising threads of processes accessing system resources of the computer system using the system access token; and
   circuitry for effectuating the remote desktop session comprising threads of processes accessing system resources of the computer system that is associated with the system access token.

2. The system of claim 1, further comprising:
   circuitry for storing a user identifier in the system access token, the user identifier created by hashing a username obtained from the web-service access token.

3. The system of claim 1, further comprising
   circuitry for generating the web-service access token from a second web-service access token, wherein the second web-service access token was issued by an authentication service for a second security realm that maintains a user account for the user.

4. The computer system of claim 1, wherein the circuitry for generating the system access token for a remote desktop session further comprises:
   circuitry for creating a user identifier from invariant information stored in the web-service access token.

5. The computer system of claim 1, wherein a user account for the user is not maintained by a computer system in a first security realm that generated the system access token.

6. The computer system of claim 1, further comprising:
   circuitry for storing user privilege information and user group information in the system access token, the user privilege information and user group information generated from claims stored in the web-service access token.

7. The computer system of claim 1, further comprising:
   circuitry for storing user information for the remote desktop session in a user profile associated with a user identifier created from invariant information stored in the web-service access token.

8. A computer readable storage device including executable instructions that, when executed on a computer, cause the computer to perform operations comprising:
   receiving a user credential;
   generating a web-service access token based on the received user credential, the web-service access token being issued by an authentication service in a first security realm;
   creating a user identifier from information in the web-service access token, the user identifier containing information used to authenticate a thread of a process to access a system resource in a remote desktop session of a computer system;
   validating an access request by the user to effectuate the remote desktop session comprising threads of processes accessing system resources of the computer system using the user identifier; and
   effectuating the remote desktop session comprising threads of processes accessing system resources of the computer system, the remote desktop session including profile settings associated with the created user identifier.

9. The computer readable storage device of claim 8, further including executable instructions that, when executed on the computer, cause the computer to perform operations comprising:
   obtaining a set of one or more claims from the web-service access token.

10. The computer readable storage device of claim 8, further including executable instructions that, when executed on the computer, cause the computer to perform operations comprising:
    storing a set of one or more privileges generated from claims stored in the web-service access token.

11. The computer readable storage device of claim 8, further including executable instructions that, when executed on the computer, cause the computer to perform operations comprising:
    generating the web-service access token in response to receiving the web-service access token issued by an authentication service in a second security realm.

12. The computer readable storage device of claim 8, wherein receiving the web-service access token further comprises:
    receiving the web-service access token conforming to the security assertion markup language standard issued by an authentication service in a first security realm.

13. The computer readable storage device of claim 8, wherein creating the user identifier further comprises:
    creating the user identifier from information that identifies an organization.

14. The computer readable storage device of claim 8, further including executable instructions that, when executed on the computer, cause the computer to perform operations comprising:
    sending the web-service access token to a computer system configured to effectuate a service, wherein the computer system being in the first security realm.

15. The computer readable storage device of claim 8, wherein creating the user identifier further comprises:
    generating the user identifier from a hash of a username.

16. The computer readable storage device of claim 8, wherein receiving the web-service access token further comprises:
    receiving the web-service access token that was digitally signed by an authentication service in a second security realm.

17. A method, comprising:
    obtaining, by one or more computers, a set of claims from a web-service access token issued by an authentication service in a first security realm, the web-service access token including information that identifies a user having an account in a second security realm, the web-service access token being based on a received user credential;
    storing, by the one or more computers, a set of privileges generated from the claims in a system access token, the set of privileges controlling access to a thread of a process to access a system resource in a remote desktop session of a computer system;
    validating, by the one or more computers, an access request by a user associated with the web-service access token to effectuate a remote desktop session comprising threads of processes accessing system resources of the computer system using the system access token; and effectuating, by the one or more computers, the remote desktop session comprising threads of processes accessing system resources of the computer system associated with the system access token.

18. The method of claim 17, further comprising:
sending the web-service access token to a computer system configured to effectuate a service, the computer system being in the first security realm.

19. The method of claim 17, wherein the web-service access token issued by an authentication service was generated in response to receiving the web-service access token issued by a second authentication service in the second security realm.

20. The method of claim 17, further comprising:
generating a user identifier from a hash of invariant information stored in the web-service access token.

* * * * *